(12) United States Patent
Cataldi et al.

(10) Patent No.: US 10,913,825 B2
(45) Date of Patent: Feb. 9, 2021

(54) PROCESS FOR THE PREPARATION OF GRAPHENE DISPERSIONS

(71) Applicants: FONDAZIONE ISTITUTO ITALIANO DI TECNOLOGIA, Genoa (IT); UNIVERSITA' DEGLI STUDI DI GENOVA, Genoa (IT)

(72) Inventors: Pietro Cataldi, Genoa (IT); Ilker Bayer, Genoa (IT); Athanasia Athanasiou, Ceranesi (IT)

(73) Assignees: FONDAZIONE ISTITUTO ITALIANO DI TECNOLOGIA, Genoa (IT), part interest; UNIVERSITA' DEGLI STUDI DI GENOVA, Genoa (IT), part interest ( * ) Notice: Subject to any disclaimer, the term of this patent is extended or adjusted under 35 U.S.C. 154(b) by 72 days.

(21) Appl. No.: 16/318,395

(22) PCT Filed: Jul. 20, 2017

(86) PCT No.: PCT/IB2017/054388
§ 371 (c)(1),
(2) Date: Jan. 17, 2019

(87) PCT Pub. No.: WO2018/015912
PCT Pub. Date: Jan. 25, 2018

(65) Prior Publication Data
US 2019/0300656 A1    Oct. 3, 2019

(30) Foreign Application Priority Data
Jul. 21, 2016 (IT) .................. 102016000075854

(51) Int. Cl.
| | |
|---|---|
| *C08J 3/09* | (2006.01) |
| *C08K 3/04* | (2006.01) |
| *C08L 1/12* | (2006.01) |
| *C09D 11/324* | (2014.01) |
| *C09D 11/52* | (2014.01) |
| *C01B 32/194* | (2017.01) |

(52) U.S. Cl.
CPC ............ *C08J 3/095* (2013.01); *C01B 32/194* (2017.08); *C08K 3/04* (2013.01); *C08K 3/042* (2017.05); *C08L 1/12* (2013.01); *C09D 11/324* (2013.01); *C09D 11/52* (2013.01); *C08J 2301/12* (2013.01); *C08J 2335/02* (2013.01); *C08K 2201/011* (2013.01); *C08L 2201/56* (2013.01); *C08L 2203/206* (2013.01)

(58) Field of Classification Search
None
See application file for complete search history.

(56) References Cited

U.S. PATENT DOCUMENTS

2016/0326343 A1* 11/2016 Ambekar ................ C08K 5/11

OTHER PUBLICATIONS

Cataldi P., et al., "Foldable conductive cellulose fiber networks modified by graphene nanoplatelet-bio-based composites," Advanced Electronic Materials, vol. 1, No. 12, Oct. 26, 2015, p. 1500224.
Fuzhong W., et al., "Multifunctional graphene nanoplatelets/cellulose nanocrystals composite paper", Composites Part B: Engineering, vol. 79, Apr. 25, 2015, pp. 521-529.
Gopiraman M, et al., "Structural and mechanical properties of cellulose acetate/graphene hybrid nanofibers: Spectroscopic investigations", Express Polymer Letters, vol. 7, No. 6, Jun. 1, 2013, pp. 554-563.
Kabiri R., et al., "Nanocrystalline cellulose acetate (NCCA)/graphene oxide (GO) nanocomposites with enhanced mechanical properties and barrier against water vapor", Cellulose, Springer Netherlands, Netherlands, vol. 21, No. 5, Aug. 19, 2014.
Kiziltas E.E., et al., "Electrically conductive nano graphite-filled bacterial cellulose composites," Carbohydrate Polymers, vol. 136, Oct. 9, 2015, pp. 1144-1151.
Lei L., et al., "Enhanced atomic oxygen erosion resistance and mechanical properties of graphene/cellulose acetate composite films", Journal of Applied Polymer Science, vol. 131, No. 11, Dec. 24, 2013, pp. n/a-n/a.
Search Report and Written Opinion of PCT/IB2017/054388 dated Sep. 14, 2017.

* cited by examiner

*Primary Examiner* — Robert T Butcher
(74) *Attorney, Agent, or Firm* — Silvia Salvadori, P.C.; Silvia Salvadori

(57) ABSTRACT

The present invention refers to a process for the preparation of a graphene dispersion comprising the following steps: i) providing cellulose acetate flakes or powders; ii) swelling the cellulose acetate flakes or powders in an alcohol having from 1 to 3 carbon atoms; iii) adding acetic anhydride in a concentration range from 30 to 50 wt % referred to the total weight of the mixture; iv) adding graphene nanoplatelets to yield a graphene dispersion. The graphene dispersion is used as ink for composite materials that are employed in the field of foldable electronics. The invention relates also to a composite material comprising uniformly dispersed graphene nanoplatelets and its use for manufacturing electronic devices.

14 Claims, 7 Drawing Sheets

PROCESS FOR THE PREPARATION OF GRAPHENE DISPERSIONS

This application is a U.S. national stage of PCT/IB2017/054388 filed on 20 Jul. 2017 which claims priority to and the benefit of Italian Application No. 102016000075854 filed on 21 Jul. 2016, the content of which are incorporated herein by reference in their entireties.

TECHNICAL FIELD

The present disclosure relates to a process for the preparation of graphene dispersions, suitable to be used as inks for composite materials that are employed in the field of foldable electronics.

BACKGROUND

The recent developments in the electronic field have generated an increasing need of new and innovative materials. On one hand, flexible conductive materials are fundamental for foldable electronics, not only for consumer electronics but also for electro-diagnostic medicine; on the other hand, the widespread presence of high frequencies devices for several applications, such as security screening, astronomy, imaging, chemical analysis, wireless receivers and transmitters devices, microwaves, cell phones, radios, etc. has brought the need of highly efficient shielding materials in the range of Terahertz frequencies.

In this framework, several flexible electric conductive materials have been developed so far and are now commercially available. Commonly, they are multilayer composite materials made up of a synthetic plastic matrix and graphene, which are suitable to be applied, by different methods (e.g. spraying, drop casting, spin coating, inkjet printing) on substrates of different nature. The main disadvantage of the currently available materials is that most of them involves a coating step of the polymer-graphene composite on substrates, but poor adhesion, chipping away of the coated material and other relevant mechanical properties can often be a strong limitation. Another relevant problem emerges when the normal electrically conductive composites are discarded: the majority of the materials employed as matrix (e.g. oil based polymers like polystyrene) or as substrate (e.g. plastics, metals), can be toxic and dangerous if disposed incorrectly, since they take long time to degrade (even 1000 years for some plastics).

In order to overcome these problems, an interesting solution is provided by foldable electronic conductive materials made up of biocompatible composites having tunable biodegradation rate, which also find direct implementation in surgery and in food packaging.

One of the most promising polymer for these applications is cellulose, which is among the most abundant biodegradable and biocompatible polymers and is already successfully employed in the form of fiber or whisker as reinforcement for various synthetic and bio-polymers. Furthermore, its popular use in paper-based printable electronics, as a paper substrate, has recently come out in addition to its potential applications in the form of functional flexible and foldable electronic biocompatible matrix for composite materials. For instance, a flexible nanocomposite having a uniformly dispersion within a three dimensional bacterial cellulose matrix was obtained by Kiziltas et al. (*Carbohydrate Polymers*. 2016, 136, 1144-1151) by immersing a highly swollen gel-like bacterial cellulose in an Erlenmeyer flask containing a dispersion of graphene platelets in isopropyl alcohol.

A common strategy to reduce the time of the graphene dispersion step, which is usually in the order of hours even when assisted by ultrasonication, is the use of a dispersant agent. The inventors of the present disclosure succeeded to embed a cellulose fiber network with a graphene nanoplatelet dispersion in chloroform comprising a commercial thermoplastic starch-aliphatic polyester blend, named Mater-Bi®, as dispersant agent (Cataldi et al. Advanced Electronic Materials 2015, 1, 1500224)

Another well-known dispersant for graphene is cellulose acetate as reported by Nakamura et al. in EP2883907.

Also Stolyravov et al. in WO2014/210584 obtained a polymer composite having a polymeric matrix embedding a graphene dispersion in cellulose triacetate. The dissolution of the dispersant cellulose triacetate is achieved by common techniques, such as by employing a known solvent of the dispesant combined with ultrasonic sonication from a time between 30 and 60 minutes.

According to the prior art, the current process for the preparation of graphene dispersions for foldable biocompatible composite materials require long time (several hours), energy consumption (stirring and ultrasonication) and often chlorinated solvents. Hence there is a strong need in this field of alternative processes for the preparation of foldable biocompatible composite materials, which are time and energy saving and more environmentally friendly.

SUMMARY OF THE INVENTION

The present disclosure relates to a process for the preparation of a graphene dispersion, characterized by a reduced consumption of energy and time. The disclosure also relates to a process for the preparation of a composite material comprising said graphene dispersion (or dried graphene nanoplatelets). The disclosure further relates to a composite material comprising uniformly dispersed graphene nanoplatelets and its use for manufacturing electronic devices. In a further aspect the disclosure refers also to an intermediate cellulose acetate solution obtained by the disclosed process.

DETAILED DESCRIPTION OF THE INVENTION

Figure 1:
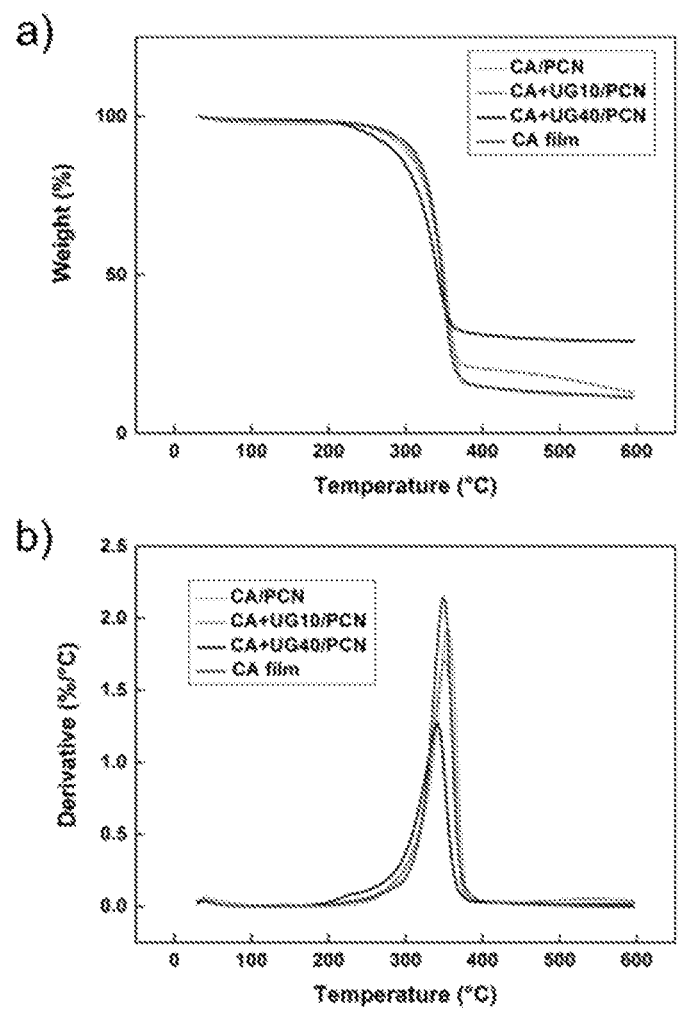
FIG. 1 shows a comparative thermogravimetric analysis of pure cellulose acetate film and the composite material obtained by the process of the disclosure at different graphene nanoplatelet concentrations. In a) it is possible to appreciate the weight percent loss as a function of temperature, whereas in b) the measurements of the first derivative of the weight loss curve with respect to temperature are reported.

For the scopes of the present disclosure, the following terms are to be intended as having the following meaning.

"Biodegradable" is here defined as a material capable of being decomposed by bacteria or other living organisms.

"Biocompatible" is here defined as not harmful or toxic to living tissues.

"Porosity is here defined as the average size of the voids or pores (open volumes) within the material. In the present application, a material is considered a porous material when having a porosity of at least 5 micron.

"Porous Cellulose Network (PCN)" is here defined as a type of cellulose similar to unsized (unfilled) printing paper in all its structural attributes including thickness, pores fiber, sizes.

"Bendable" is here defined as capable of being bent, flexed or twisted without breaking under load or pressing not by simply bending by hand.

In a first aspect, the present disclosure relates to a process for the preparation of a graphene dispersion comprising the following steps:
i) providing cellulose acetate flakes or powders;
ii) swelling cellulose acetate in an alcohol having from 1 to 3 carbon atoms;
iii) adding pure (>98%) acetic anhydride in a concentration range from 30 to 50 wt % referred to the total weight of the mixture;
iv) adding graphene nanoplatelets.

The here described process provides a solution to the slowness of the dissolution step of graphene dispersants in the preparation of graphene dispersions.

The process achieves this result thanks to the unique combination of step ii) and iii) wherein, firstly, cellulose acetate flakes or powders are swollen in an alcohol having from 1 to 3 carbon atoms, for few minutes and, subsequently, acetic anhydride is added, leading to the dissolution of cellulose acetate in a few seconds. The particularity of this solvent system is that cellulose acetate is not soluble in the mentioned alcohols, indeed it is only swollen. It is only when acetic anhydride is added that cellulose acetate is dissolved in a few seconds without the need of mechanical stirring. The solution obtained after adding acetic anhydride is a clear solution. What is surprising is that, under similar conditions, cellulose acetate dissolves in other well-known solvents for cellulose acetate, such as acetone, ethyl acetate or chloromethane, in hours and with mechanical stirring.

This is even more surprising when considering that the inventors have found that dissolution of the same quantity of cellulose acetate in a pre-mixed composition of acetic acid and acetic anhydride can take up to few hours.

The starting cellulose acetate flakes or powders provided in step i) are both characterized by a large surface area. This means that the solvent is most effective when dissolution of cellulose acetate is made from flakes with surface area ranging from 500 $m^2$/g to 1600 $m^2$/g similar to the surface areas found in cellulose acetate cigarette filters instead of cellulose acetate films or slabs.

In a preferred embodiment, the disclosed process is carried out by employing cellulose acetate having a degree of acetylation of 35% to 60% but preferably 40%-50% as starting material.

Step ii) is carried out by adding cellulose acetate to an alcohol having from 1 to 3 carbon atoms. The alcohol used in step ii) is a linear or branched alkyl alcohol having from 1 to 3 carbon atoms. Preferably the alcohol is selected from methyl, ethyl, propyl and isopropyl alcohol and mixture thereof. More preferably the alcohol is ethyl alcohol.

The characteristic of this system is that cellulose acetate is not soluble in the mentioned alcohol and only swelling of cellulose acetate occurs. The duration of this step is of a few minutes.

In step iii), acetic anhydride in a concentration range between 30 and 50 wt %, preferably 47 wt %, referred to the total weight of the mixture, is added to the cellulose acetate-alcohol swelling system. The solvent system alcohol-acetic anhydride leads to a decrease of temperature and to the dissolution of the swollen cellulose acetate flakes or powders in a few minutes/seconds without stirring.

Finally, a proper amount (according to the desired final electrical conductivity of the graphene dispersion) of graphene nanoplatelets is added to the clear solution obtained in the previous step.

In a further preferred embodiment, the graphene nanoplatelets added in step iv) are in a concentration range of between 8 and 5 wt %, preferably between 15 and 35 wt %, relative to the dissolved cellulose acetate.

The graphene dispersion in cellulose acetate obtained according to the process of the disclosure, may be employed as conductive ink for the preparation of composite materials that need to be biocompatible and biodegradable. The composite materials are preferably used in the sector of foldable electronics.

The present disclosure therefore relates to a process for the preparation of a composite material comprising the following additional step carried out after the above described steps from i) to iv):
v) impregnating a porous matrix with the graphene dispersion obtained in step iv).

In a preferred embodiment, the process for the preparation of a composite material comprises additional steps vi) and vii), performed after step v).

The steps are as follows:
vi) curing the composite material of step v) at a temperature between 175 and 225° C.;
vii) wiping the cured composite material of step vi).

In step v), the impregnation can be carried out using well-known impregnation techniques, such as spraying, drop casting, spin coating, inkjet printing.

The curing step vi) is aimed at ensuring an homogenous distribution of the graphene dispersion in the cellulose matrix and also at removing possible residual solvent.

The final step vii) is carried out on the surface of the composite material by applying common wiping techniques, for example by using polishing tissues, up to the attainment of a flat surface. This finishing step allows to remove the surplus part of the dispersion which is not well embedded in the porous matrix and to ensure isotropic conductivity to the final composite material.

The porous matrix preferably used in the process of the disclosure is a bendable porous matrix. More preferably, the porous matrix is a cellulose matrix. Even more preferably the porous matrix is Porous Cellulose Network (PCN).

Other matrixes which have absorption properties, texture and porous structure similar to PCN, such as textiles, cloths and woven non-woven may be used.

In one embodiment, the present disclosure relates also to a composite material obtainable from the process of the present disclosure comprising a porous matrix, preferably a bending porous matrix, embedded with graphene nanoplatelets.

The composite material, in addition to biocompatibility and biodegradability, shows also high conductivity, resistance to folding and abrasion. It is therefore suitable to be used for the manufacturing of flexible electrodes, which may also find application in electro-diagnostic medicine, such as in the electromyography technique. In this technique, the signal is normally recorded by employing electrodes made of rigid metallic materials (which have an average cost of several hundred dollars), but, since human body has a curvilinear form, it would be useful to employ a flexible electrode, also able to acquire the signal during continuous exercise or movement of the patient.

The composite material of the disclosure, being flexible, can adapt to the human muscle shape and can also be used in dirty areas of the body. Furthermore the flexible electrodes made up of this composite material are biodegradable and thus easy to dispose.

Another possible application of the above described composite material is the manufacturing of thin and light weight Electro Magnetic Interference (EMI) shielding devices. For instance, objects that needs to be protected from Electromagnetic waves may be packed or wrapped with the foldable biocompatible and biodegradable composite material of the disclosure.

In a further aspect, the present disclosure also relates to an intermediate cellulose acetate solution obtained according to steps from i) to iii) of the present process, having a cellulose acetate concentration between 0.5 and 10 wt %, preferably between 1 and 8.5 wt %. The clear cellulose acetate solution obtained after this step may be advantageously employed for the preparation of other products: for instance to cast films, having feature clear transparent plastics regardless of evaporation rate of the solvent blend; on the contrary, with other solvents, such as acetone, the evaporation rate can create films with porous non-uniform and non-transparent or hazy films.

EXAMPLES

Example 1: Preparation of the Graphene Dispersion and Spray on the Matrix

The graphene dispersion acting as conductive ink was prepared in a binary solvent composed of equal amount of ethanol and acetic anhydride. The dispersion of cellulose acetate and graphene nanoplatelets was prepared first by mixing the ethanol (20 ml) with the starting polymer (1 g) and subsequently adding acetic anhydride (20 ml). After 5 minutes, to ensure the complete dissolution of the cellulose acetate, the graphene nanoplatelets were added to the solution with a concentration range from 0.5% to 50% but preferably from 5% to 30% relative to the weight of the biopolymer. The dispersion was then tip sonicated (750 W, 40% Amplitude, 20 kHz, 6 times for 15 s) and sprayed on the porous cellulose network (PCN). After spraying, the curing process of one minute was performed using an heat gun set at 220° C. with an airflow of 250 l/min. The as prepared sample surfaces were wiped with polishing tissues to obtain flat surfaces and remove the part of the dispersion which was not well embedded in the PCN. This procedure was realized on both side of the PCN paper to ensure isotropic conductivity.

Example 1A

Example 1 was repeated using regenerated cellulose as porous matrix instead of the porous cellulose network (PCN). Regenerated cellulose is obtained from treating cellulosic materials (including recycled paper) with the viscose process and subsequent wet spinning into water and drying. Most of the regenerated cellulose materials are porous membranes with micro-pores.

The regenerated cellulose matrix was impregnated with the cellulose-acetate-GnPs inks produced according to claim 1 by spray-painting and hot-pressing technique.

Example 2 (Comparative): Dissolution Rate Comparison of Cellulose Acetate in Several Solvents The following table compares solubility speed of cellulose acetate (M.W. 30,000 with 39.8 wt. % acetylation) in various solvents. The concentration is 67 mg/ml. Measurements made at 23° C. and ~40% RH.

| Solvent | Solution time (min) | Appearance | Comments |
| --- | --- | --- | --- |
| Acetone | 15-20 | Clear | Mechanical mixing |
| Ethyl acetate | 20-35 | Hazy | Mechanical mixing |
| Dichloromethane | 5-7 | Clear | Not needed |
| Dimethyl sulfoxide | 10-16 | Clear | Mechanical mixing |
| Dimethylacetamide (DMAC) | 10-16 | Clear | Mechanical mixing |
| Tetrahydrofuran | 8-12 | Clear | Mechanical mixing |
| Trifluoroacetic acid (TFA) | 5-8 | Clear | Not needed |
| Methanol-Acetic anhydride (IIT) | 0.3-0.8 | Clear | Not needed |
| Ethanol-Acetic anhydride (IIT) | 0.4-1.2 | Clear | Not needed |
| Isopropanol-Acetic anhydride (IIT) | 0.25-1.1 | Clear | Not needed |

Example 3: Thermal Stability of the Composite Material

The thermal stability of the composite material obtained according to the present disclosure, having embedded different amounts of graphene nanoplatelets was investigated by thermogravimetric analysis in comparison with a pure cellulose acetate film, as reported FIG. 1. All the samples showed only a degradation step and proved a thermal stability up to 200° C. In particular, CA/PCN is a sample with only cellulose acetate sprayed on the porous cellulose network (without graphene), while CA+UG10/PCN and CA+UG40/PCN are samples sprayed with the graphene dispersion respectively of 10 and 40 wt % of GnPs relative to cellulose acetate.

Example 4: Electrical Properties Characterization

Figure 2:
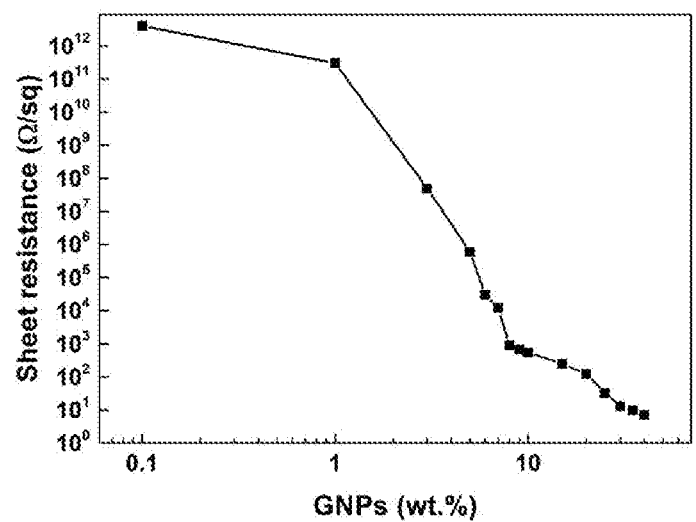
FIG. 2 shows a semi-logarithmic plot wherein the sheet resistance of the samples prepared according to example 1 versus the weight percentage of the added graphene nanoplatelets is reported.
Figure 7:
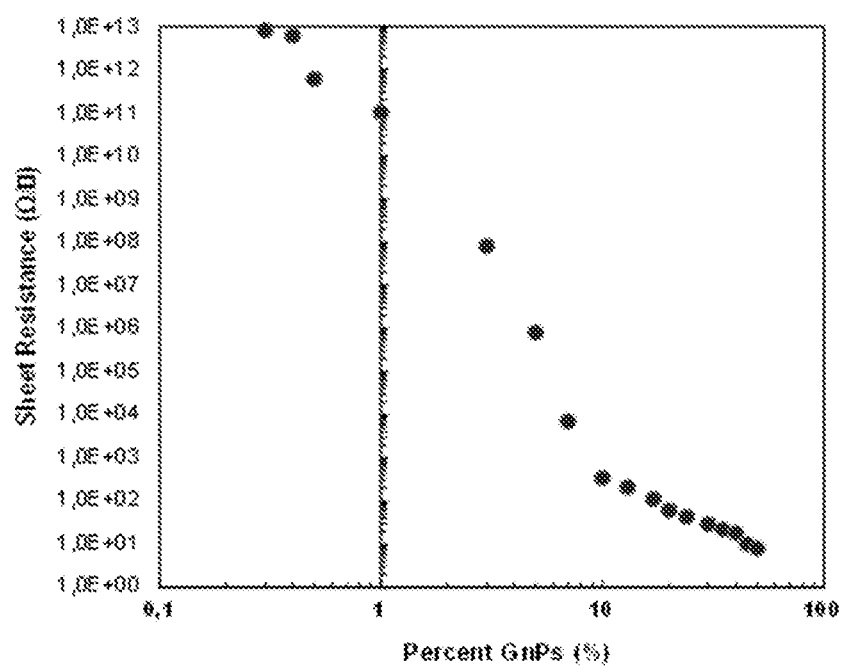
FIG. 7 shows a semi-logarithmic plot wherein the sheet resistance of the samples prepared according to example 1A versus the weight percentage of the added graphene nanoplatelets is reported.

The sheet resistance dependence on graphene nanoplatelets amount was evaluated with a four probe measurements of sheet resistance of the same sample at different wt % concentration of graphene nanoplatelets in the composite materials. As can be seen from FIG. 2 (referring to the porous cellulose matrix of example 1) and from FIG. 7 (referring to the regenerated cellulose matrix of example 1A), the order of magnitude of 10 Ω/sq was reached at a value of graphene concentration of 30 wt %.

Example 5: Foldability Experiments

Figure 3:
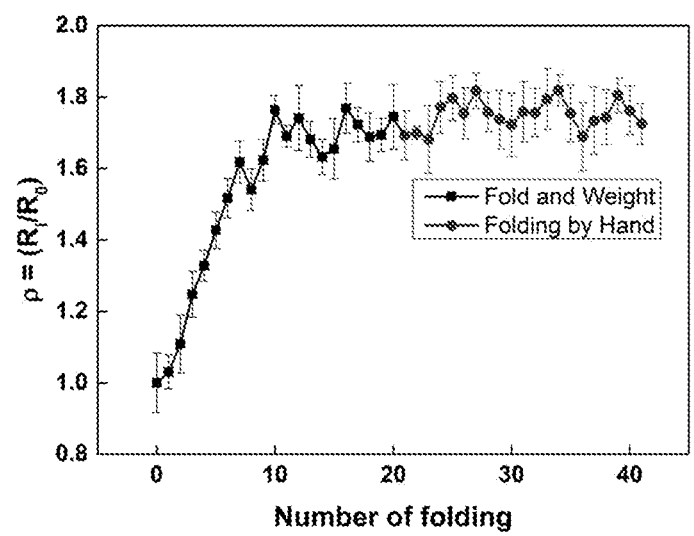
FIG. 3 reports the outcomes of the resistance tests to complete bending of the composite material of the disclosure: the plot shows the sheet resistance variation versus the number of folding events.

In order to test the foldability of the composite material, four probe measurements were performed after several complete folding events: the same sample was bent many times and after each bending event the resistance was measured. This method was made repeatable by placing, after each complete bending, a weight of 5 kg on the bent edge to ensure that a constant force is applied on the bent edge. After the $20^{th}$ cycle, the folding was continued by hand. Due to folding, the surface sheet resistance increases causing the ratio $R_i/R_0$ to raise ($R_0$ represents the initial sheet resistance before the folding cycles and $R_i$ represents the sheet resistance at the $i^{th}$ folding event). As can be seen from FIG. 3, the sheet resistance almost doubled its initial value after 20 bending events (folding and pressing, square-line of FIG. 3). This means that starting from approximately 10 Ω/sq, the sheet resistance increases to 20 Ω/sq; after that the bending cycles were completed. Thereafter the sheet resistance value was stable (folding by hand, point-line of FIG. 3).

Example 6: Abrasion Resistance Test

Figure 4:
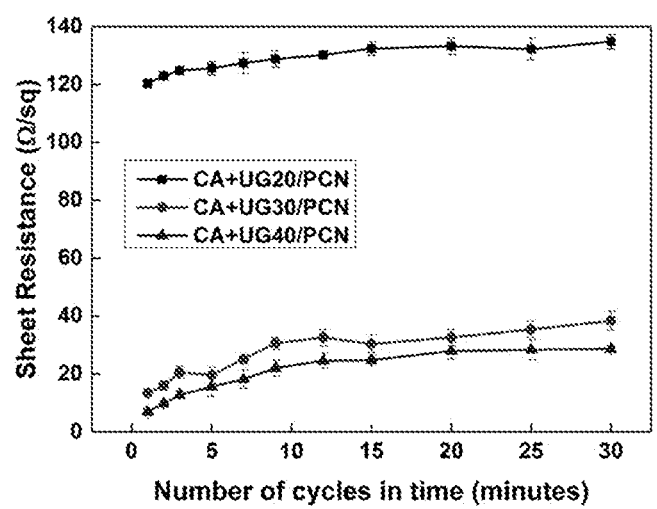
FIG. 4 reports the outcomes of the resistance tests to abrasion of composite materials of the disclosure: the plot shows the sheet resistance variation versus the number of abrasion cycles.
Figure 5:
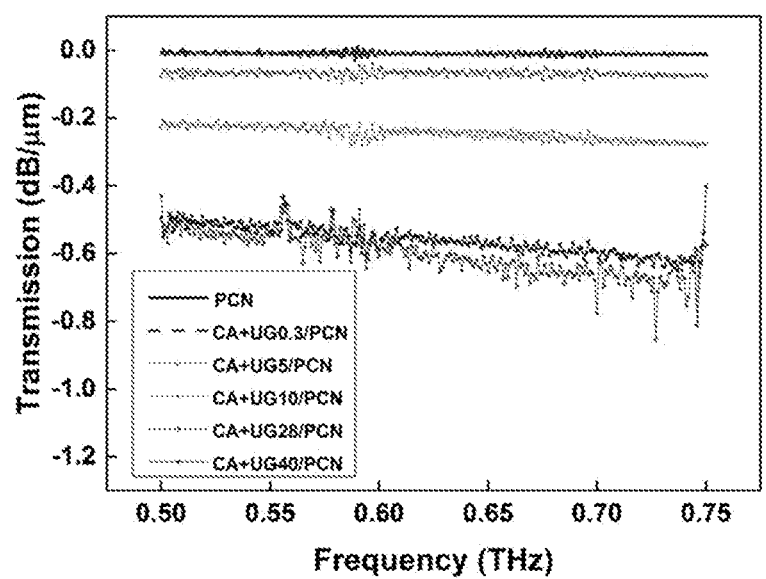
FIG. 5 shows the EMI shielding properties of the obtained composite material at different frequencies in the range of THz.

The abrasion resistance tests of the samples were performed using a plastic disk abrading (Rockwell Hardness M70) under 20 kP pressure using a vibratory polishing machine and thirty cycles of abrasion tests were carried out. As can be seen from the graph of FIG. 4, the conductivity loss as a function of abrasion cycles shows a flat almost linear behavior. The increases in resistance are in average 0.5, 0.8 and 0.7 Ω/sq every single cycle, respectively for the tested 20, 30 and 40 wt % graphene nanoplatelets concentration relative to cellulose acetate.

Example 7: EMI Shielding Tests

The obtained composite material exhibits excellent shielding properties in the range of THz frequencies, even it is possible to screen in other EM frequencies range (GHz and MHz). It is remarkable that a screen value of 60 dB with a material of 70 µm thickness was reached. The EMI shielding effectiveness (SE or −T) of the samples was measured using a full two-port WR-1.5 (0.5-0.75 THz) vector network analyzer (VNA) consisting of an Agilent N5245 A PNA-X and two WR-1.5 frequency extenders (Virginia Diodes, Inc.). The THz radiation from port 1 of the VNA was coupled to port 2 through four off-axis parabolic mirrors. The sample under test was placed in the THz signal path using a XYZ positioning stage for measurement.

Example 8: Electrode for Electromyography (EMG)

Here it is proved the excellent isotopically electrical conduction of the obtained composite material, which is used as flexible, wearable, easy disposable and cheap electrode for EMG.

Figure 6:
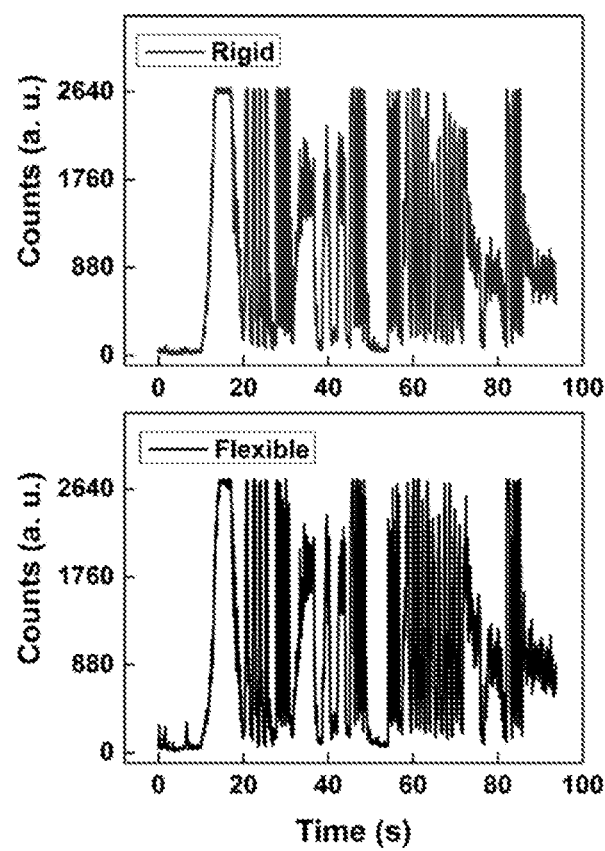
FIG. 6 shows the comparative tests between a commercially available electrode for electromyography and a prototype made using the composite material of the present disclosure.

In order to manufacture the electrode, three titanium metal surfaces were covered with the composite material of the present disclosure having 40 wt % of graphene nanoplatelets relative to cellulose acetate. This is basically a combination for resistors connected in series and the overall response is dictated by the highest resistor (i.e. in this case the composite material). The standard electrodes for EMG, named Rigid in FIG. 6, are made of titanium and have a resistivity in the order of $10^{-6}$-$10^{-8}$ Ω·m, while the composite material has a resistivity in the order of $10^{-1}$-$10^{-3}$ Ω·m: therefore, since the two resistances are in series, the Flexible electrode has, at first approximation, the resistance of the testing material (the resistance of the titanium is too small to count). The two electrodes were placed close to one another in direct contact with a human forearm and were wrapped with a strip. The signal was measured simultaneously with both the electrodes. Through both electrodes it was possible to acquire the signal when the muscles were contracted.

The acquired signals are almost identical in intensity (counts, saturation at 2640) and shape or morphology. Slight differences could appear because different muscular area were monitored as the electrodes were not contacted with the same muscles.

In FIG. 6, the two plots report a comparison of the signals of the Rigid electrode and the Flexible electrode when the muscle is contracted, as a function of time.

The invention claimed is:

1. A process for the preparation of a graphene dispersion comprising the following steps:
   i) providing cellulose acetate flakes or powders;
   ii) swelling the cellulose acetate flakes or powders in an alcohol having from 1 to 3 carbon atoms;
   iii) adding acetic anhydride in a concentration range from 30 to 50 wt % referred to the total weight of the mixture;
   iv) adding graphene nanoplatelets to yield a graphene dispersion.

2. A process according to claim 1, wherein the cellulose acetate of step i) has an acetylation degree of 35% to 60%.

3. A process according to claim 1, wherein the alcohol of step ii) is a linear or branched alkyl alcohol.

4. A process according to claim 1, wherein the alcohol of step ii) is ethyl alcohol.

5. A process according to claim 1, wherein the acetic anhydride of step iii) is added in a concentration range from 1 to 8.5 wt % referred to the total weight of cellulose acetate.

6. A process according to claim 1 wherein the graphene nanoplatelets of step iv) are added in a concentration range from 5 to 30 wt % referred to the cellulose acetate.

7. A process for the preparation of a composite material comprising steps from i) to iv) according to claim 1 further comprising the following step:
   v) impregnating a porous matrix with the graphene dispersion of step iv).

8. A process for the preparation of a composite material according to claim 7, further comprising the following steps:
   vi) curing the composite material of step v) at a temperature comprised between 175 and 225° C.;
   vii) wiping the cured composite material of step vi).

9. A process for the preparation of a composite material according to claim 7, wherein the matrix of step v) has a porosity of at least 5 microns.

10. A process for the preparation of a composite material according to claim 7, wherein said matrix is a porous cellulose network.

11. A method for manufacturing flexible electronics with a composite material comprising a porous matrix embedded with a graphene dispersion or dried graphene nanoplatelets, said method comprising
   covering said electronic with said composite material; and
   obtaining said flexible electronics.

12. The process according to claim 1, wherein the cellulose acetate of step i) has an acetylation degree of 40%.

13. The process according to claim 1 wherein the alcohol of step ii) is selected from the group consisting of methyl, ethyl, propyl, isopropyl alcohol and mixture thereof.

14. The process according to claim 11, wherein said flexible electronics comprise flexible electrodes or high frequencies Electro Magnetic Interference shields.

\* \* \* \* \*